United States Patent
Kurosawa (10) Patent No.: US 8,869,853 B2
(45) Date of Patent: Oct. 28, 2014

(54) PNEUMATIC TIRE

(75) Inventor: Hiroyuki Kurosawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 304 days.

(21) Appl. No.: 13/238,035

(22) Filed: Sep. 21, 2011

(65) Prior Publication Data

US 2012/0073719 A1   Mar. 29, 2012

(30) Foreign Application Priority Data

Sep. 24, 2010 (JP) ................. 2010-214084

(51) Int. Cl.
*B60C 13/00* (2006.01)
*B60C 13/02* (2006.01)

(52) U.S. Cl.
USPC ............................................. 152/523

(58) Field of Classification Search
USPC ........................ 152/523, 524, 525
See application file for complete search history.

(56) References Cited

U.S. PATENT DOCUMENTS 3,568,747 A * 3/1971 Fletcher et al. .............. 152/154

FOREIGN PATENT DOCUMENTS

| JP | 10-76816 | * | 3/1998 |
|---|---|---|---|
| JP | 2003-112505 A | | 4/2003 |
| JP | 2007-297035 | * | 11/2007 |
| JP | 2008-279900 | * | 11/2008 |
| JP | 2009-29380 | * | 2/2009 |

OTHER PUBLICATIONS

Machine translation of JP 10-76816, 1998.*

* cited by examiner

*Primary Examiner* — Justin Fischer
(74) *Attorney, Agent, or Firm* — Birch, Stewart, Kolasch & Birch, LLP (57) ABSTRACT

A pneumatic tire comprising a plurality of protector ribs 9 disposed on outer surface 3a of at least one sidewall portion 3 at intervals in the circumferential direction, each protector rib 9 projecting axially outwardly, extending at an angle α of 5 to 25° with respect to the radial direction, and including outer wall 10 extending from a radially outer edge 13 having a circumferential length L1 of 10 to 25 mm, to maximum projecting portion 14 at which thickness t1 of the rib 9 reaches a maximum, and in a meridian cross section of the tire in a normal loaded state, the outer wall 10 being parallel to flat surface M or extending from the outer edge 13 toward the maximum projecting portion 14 with inclination in a direction away from the flat surface M at an angle of at most 15° with respect to the flat surface M.

9 Claims, 7 Drawing Sheets

PRIOR ART

PNEUMATIC TIRE

BACKGROUND OF THE INVENTION

The present invention relates to a pneumatic tire including a protector disposed on the surface of a sidewall, more particularly to a pneumatic tire having a ride comfortability improved with maintaining a good cut resistance and with suppressing increase in weight of the tire.

Figure 7:
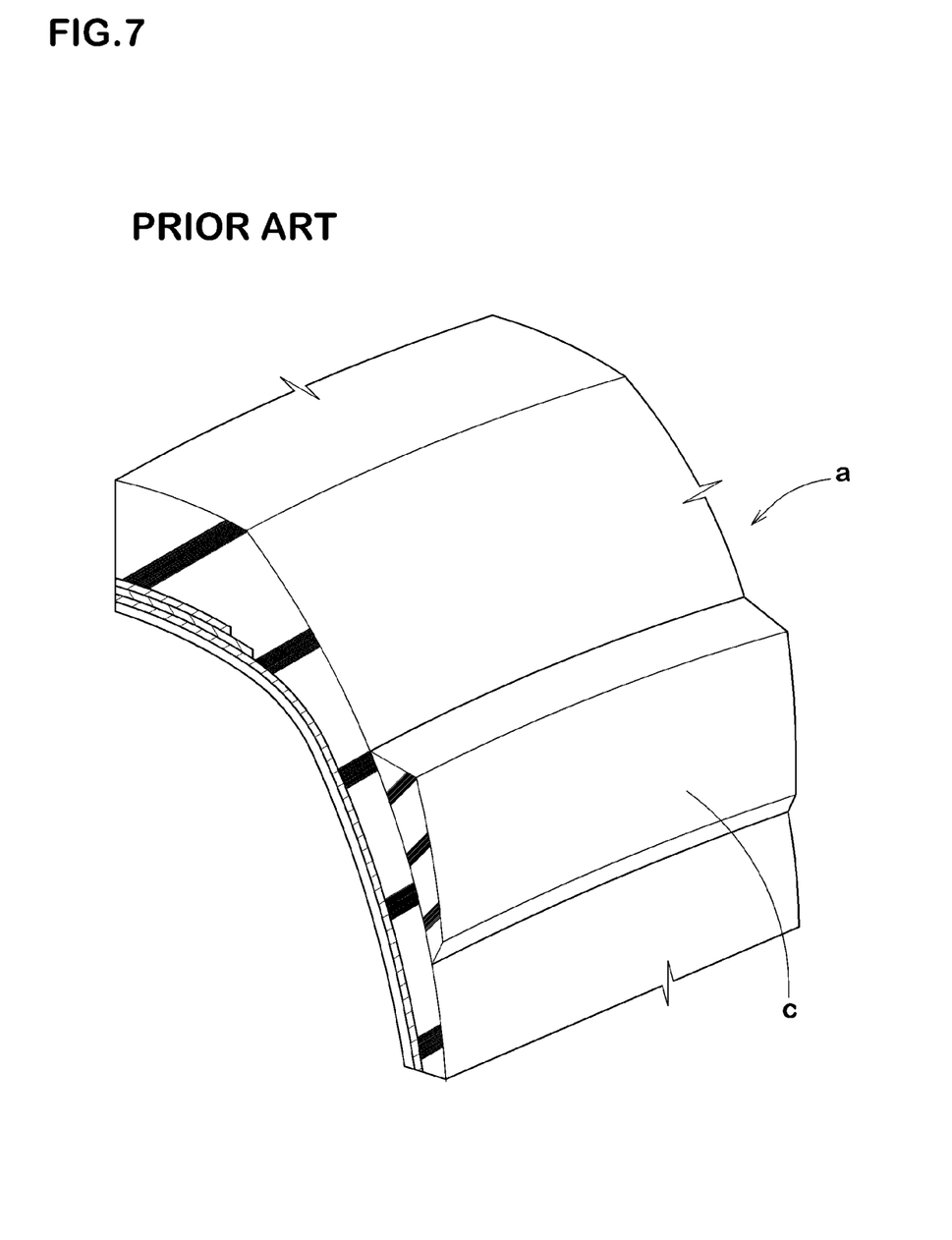
FIG. 7 is a partial perspective view of a sidewall portion of a tire illustrating a conventional protector.

Pneumatic tires used for vehicles traveling on rough roads, e.g., four-wheel-drive cars and trucks, frequently get a cut at the sidewall portion by impact of stones. Therefore, in order to prevent such a damage, it is proposed to enhance the cut resistance by disposing a protector on the surface of a sidewall portion of the tire. For example, JP 2003-112505 A discloses disposing a protector "c" projecting axially outwardly as shown in FIG. 7 on the surface of a sidewall portion "a". However, since such a protector "c" extends continuously in a circumferential direction of the tire, the volume of a rubber increases, thus resulting in increase of the tire weight. Further, such an annular protector "c" has a problem that the ride comfortability is deteriorated since the longitudinal rigidity of the tire is excessively enhanced by the protector.

Accordingly, it is an object of the present invention to provide a pneumatic tire including a protector disposed on the surface of a sidewall and having a ride comfortability improved with maintaining a good cut resistance and with suppressing increase of the tire weight.

This and other objects of the present invention will become apparent from the description hereinafter.

SUMMARY OF THE INVENTION

The above-mentioned object has now been achieved by disposing a plurality of protector ribs on an outer surface of a sidewall portion at intervals in a circumferential direction of the tire, each protector rib having a specific configuration and extending in a radial direction of the tire at a specific angle with respect to the radial direction.

In accordance with the present invention, there is provided a pneumatic tire comprising a tread portion; a pair of sidewall portions extending radially inwardly from both axial ends of the tread portion; a pair of bead portions disposed at radially inner ends of the sidewall portions; and a plurality of protector ribs disposed on an outer surface of at least one of said sidewall portions at intervals in a circumferential direction of the tire, each of said protector ribs extending at an angle of 5 to 25° with respect to the radial direction and having a configuration such that it projects axially outwardly and includes an outer wall facing radially outwardly and extending from an outer edge of the rib which is located on the tread portion side and has a circumferential length of 10 to 25 mm, to a maximum projecting portion at which the protector rib reaches its maximum thickness, and in a meridian cross section of the tire including a rotation axis of the tire in a normal loaded state that the tire is mounted on a standard rim and inflated to a normal inner pressure, a normal load is applied to the tire and the tire is brought into contact with a flat surface at a camber angle of 0°, said outer wall of the protector rib being parallel to said flat surface or extending from said outer edge toward said maximum projecting portion with inclination in a direction away from said flat surface at an angle of at most 15° with respect to said flat surface.

In a preferable embodiment of the present invention, the outer wall of the protector rib has an approximately trapezoidal shape such that the circumferential width thereof gradually decreases in a direction from the outer edge toward the maximum projecting portion. It is preferable that the circumferential length of the maximum projecting portion is from 80 to 95% of the circumferential length of the outer edge.

The protector rib may have such a thickness as gradually decreasing from the maximum projecting portion toward a radially inner side of the tire.

In a preferable embodiment of the present invention, the protector rib has a deformed pyramid shape including the outer wall, an inner wall extending from the maximum projecting portion toward a radially inner side of the tire, and a pair of side walls extending from the inner wall toward an axially inner side of the tire. The tip of the deformed pyramid may be truncated. It is preferable that the inner wall of the protector rib has an area of 70 to 100% of an area of a virtual surface extending between the outer edge of the rib and a radially inner end along the surface of the sidewall portion.

In a preferable embodiment, at least one small groove extending in the circumferential direction is formed on the sidewall portion in a region extending from the outer edge of the protector rib toward a radially outer side of the tire by a distance of at most 15 mm. Preferably, two small grooves are disposed separately in the radial direction. Of two small grooves, an inner small groove disposed radially inner side of the tire may be continuous with the outer edge of the protector rib.

The protector ribs according to the present invention can exhibit an excellent cut resistance and, furthermore, can suppress increase in the longitudinal rigidity of the tire to improve the ride comfortability with suppressing increase in rubber volume to reduce the weight of the tire. Since the protector ribs according to the present invention have a configuration as mentioned above, they can ensure enough rigidity against an external force applied from the radial or circumferential direction of the tire. Therefore, a protector can be downsized to achieve weight reduction of tires by using the protector ribs according to the present invention. Further, since the outer wall of the protector ribs is parallel to the ground or is inclined at an angle of at most 15° with respect to the ground, stones or the like hitting the outer wall bounce outside the tire. Therefore, damage of the sidewall portion is suppressed, so the cut resistance of the tire is improved.

DETAILED DESCRIPTION OF THE INVENTION

An embodiment of the present invention will now be explained with reference to the accompanying drawings.

Figure 1:
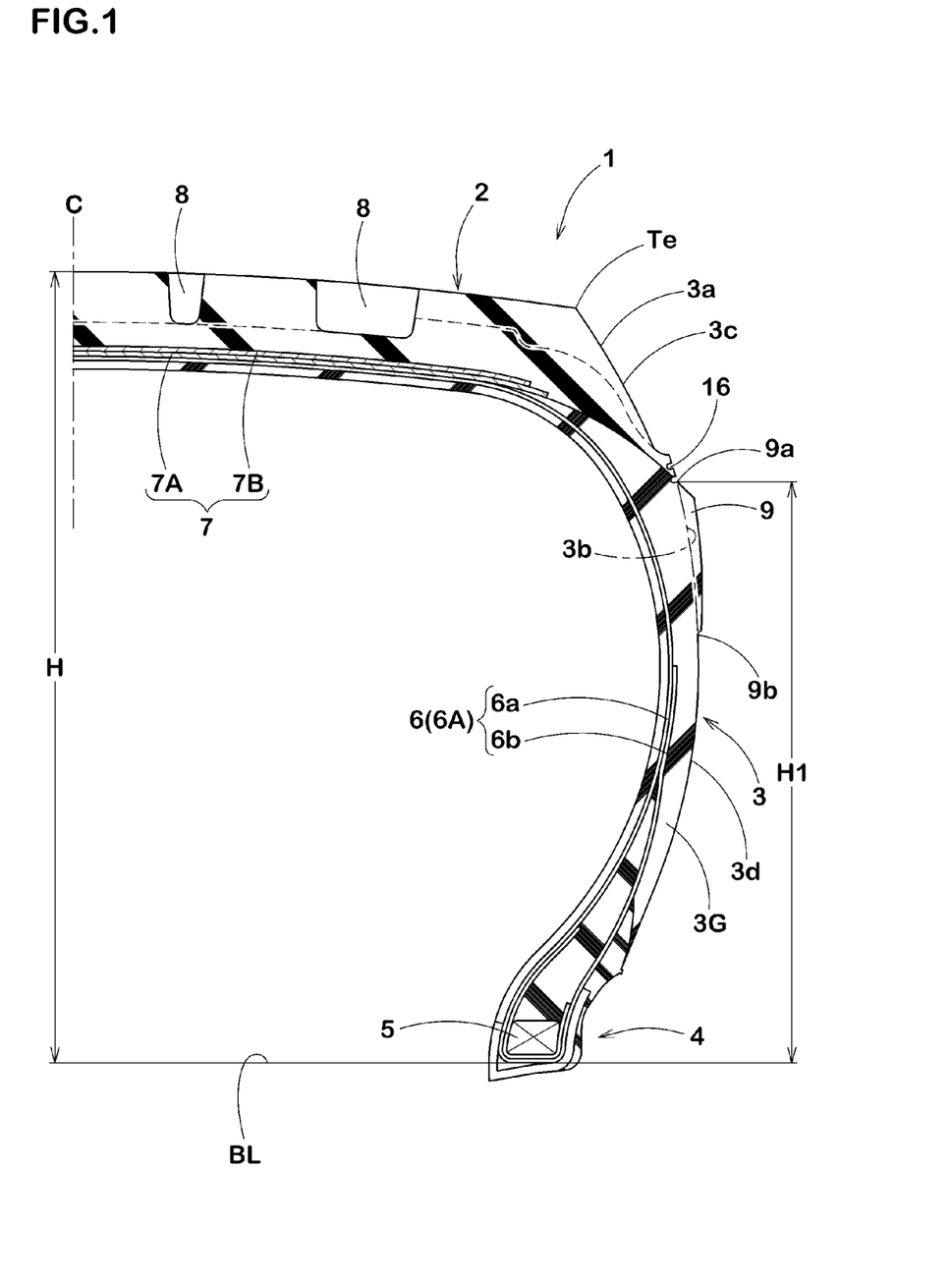
FIG. 1 is a cross sectional view of a right half of a pneumatic tire showing an embodiment of the present invention.

FIG. 1 is a cross sectional view of a pneumatic tire 1 in a standard state according to an embodiment of the present invention. The pneumatic tire 1 in this embodiment includes, at the least, a tread portion 2, a pair of sidewall portions 3 extending radially inwardly from both axial ends Te of the tread portion 2; a pair of bead portions 4 disposed at radially inner ends of the sidewall portions 3.

The term "standard state" as used herein means a state that the tire is mounted on a standard rim (not shown) and inflated to a normal inner pressure and no load is applied to the tire. In the specification, the "dimensions" of respective parts or portions of the tire denotes those measured in the standard state, unless otherwise noted.

The term "standard rim" as used herein means a rim defined for every tire in a standardizing system on which the tire is based and, for example, denotes "standard rim" in JATMA, "design rim" in TRA and "measuring rim" in ETRTO. Also, the term "normal inner pressure" as used herein means an air pressure defined for every tire in a standardizing system and, for example, denotes "maximum air pressure" in JATMA, a maximum value recited in the table of "Tire Load Limits at Various Cold Inflation Pressures" in TRA, and "Inflation Pressure" in ETRTO.

The pneumatic tire 1 in this embodiment further includes a carcass 6 that extends from the tread portion 2 to each of bead cores 5 in the opposing bead portions 4 through the sidewall portions 3, and a belt layer 7 disposed radially outward of the carcass 6 and inside the tread portion 2. The tread portion 2 may be suitably provided with grooves 8 for drainage.

The carcass 6 comprises at least one carcass ply 6A (in this embodiment, single carcass ply) in which carcass cords are disposed at an angle, for example, of 75 to 90° with respect to a tire equator C. The carcass cords include, for instance, organic fiber cords and steel cords. The carcass ply 6A is composed of a toroidal main body portion 6a that extends from one bead core 5 to the opposing bead core 5, passing through the crown region of the tire, and turnup portions 6b that are continuous with the main body portion 6a and are turned up around the bead cores 5 from the axially inside to the axially outside of the tire to thereby anchor the carcass ply.

The belt layer 7 comprises at least two belt plies. The belt layer 7 in this embodiment is composed of two belt plies 7A and 7B in each of which belt cords having a high elasticity, e.g., steel cords, are arranged at an angle of 15 to 40° with respect to the tire equator C. The belt plies 7A and 7B are stacked so that the belt cords in one ply crosses the cords in the other belt ply.

The pneumatic tire of the present invention is provided with a plurality of protector ribs 9 which project axially outwardly, on an outer surface 3a of at least one of the sidewall portions 3. The protector ribs 9 in this embodiment are made of a rubber and are disposed on the both sidewall portions 3.

Figure 2:
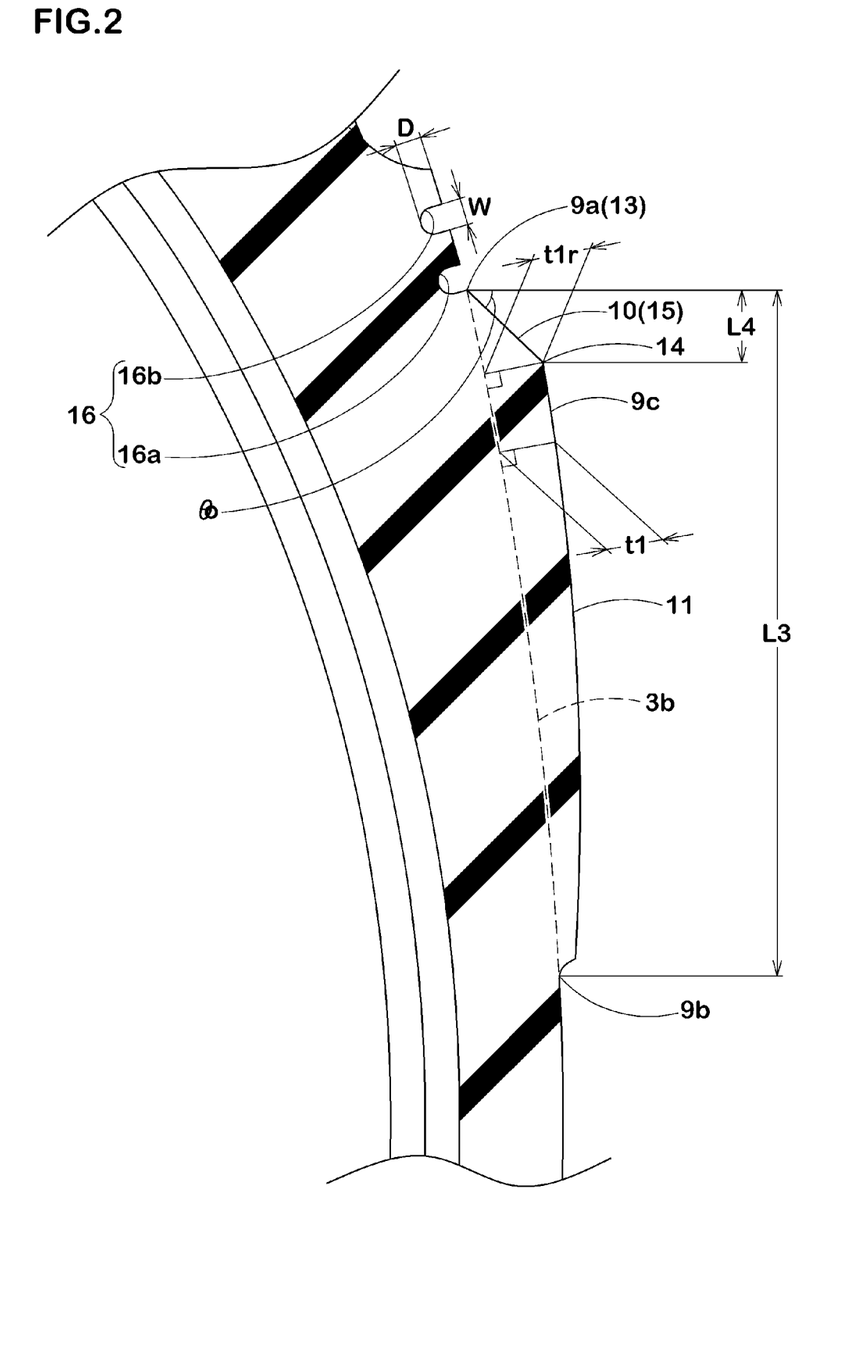
FIG. 2 is an enlarged partial cross sectional view showing a portion near a protector rib in the tire shown in FIG. 1.

As shown in FIGS. 1 and 2, each of the protector ribs 9 has a radially outer end 9a and a radially inner end 9b. The radially outer end 9a is continuous with an outer region 3c of the sidewall portion 3, and the radially inner end 9b is continuous with an inner region 3d of the sidewall portion 3. The projector rib 9 is formed to project so as to stand out axially outwardly in a region between the outer region 3c and an inner region 3d.

As shown in FIG. 1, a height H1 of the radially outer end 9a of the protector rib 9 from a bead base line BL is preferably at least 60%, more preferably at least 65%, of a section height H of the tire from the bead base line BL, and it is preferably at most 80%, more preferably at most 75%, of the section height H. If the height H1 is too large, there is a possibility that the protector rib becomes larger, so the tire weight increases. On the other hand, if the height H1 is too small, there is a possibility that the tire cannot exhibit a good cut resistance.

A radial length L3 of the protector rib 9 is preferably at least 13%, more preferably at least 15%, of the section height H of the tire, and is preferably at most 21%, more preferably at most 17%, of the section height H of the tire.

Figure 3:
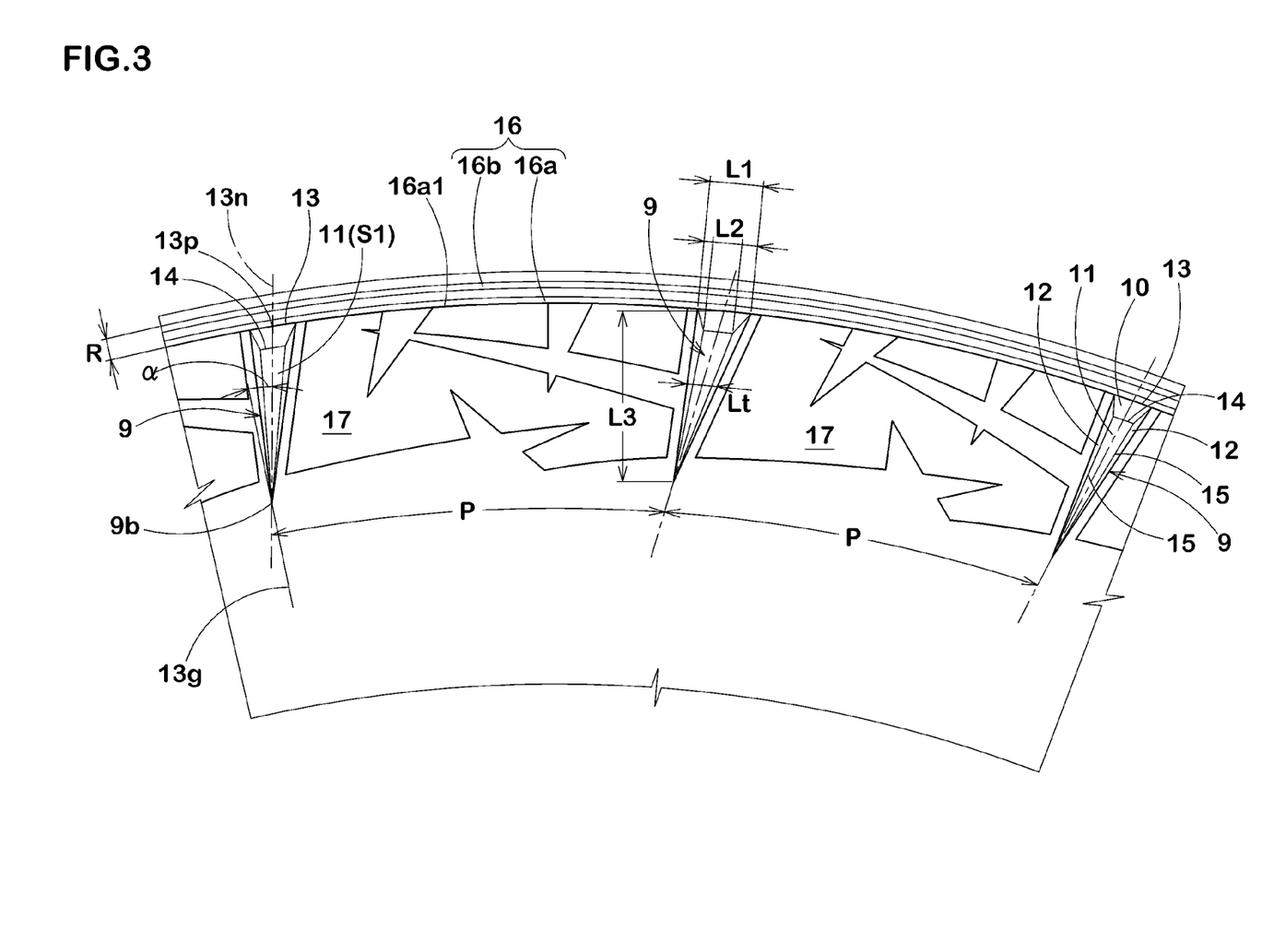
FIG. 3 is a partial side view of the tire showing an arrangement of the protector ribs.
Figure 4:
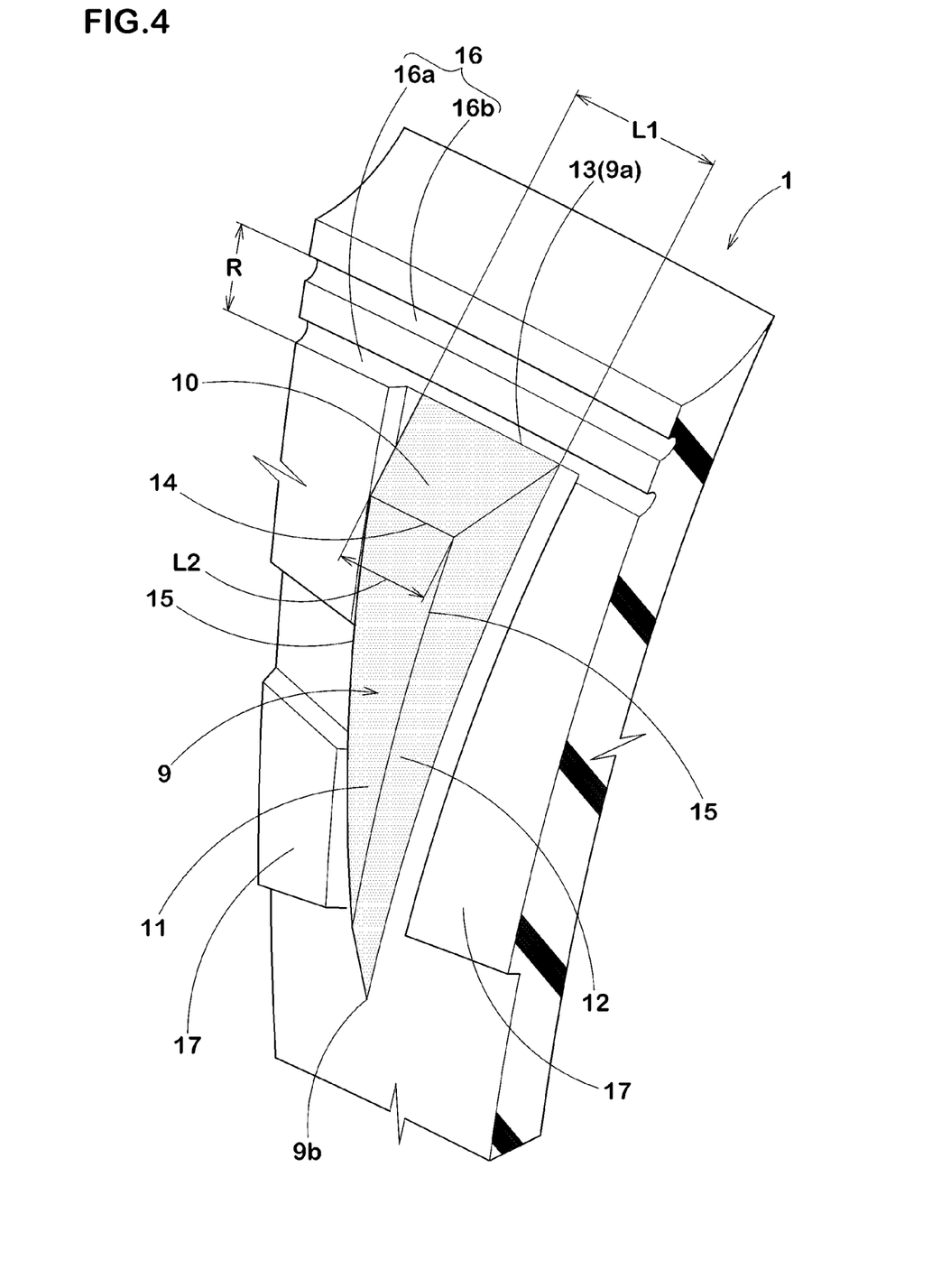
FIG. 4 is an enlarged perspective view showing a portion near the protector rib.

As shown in FIGS. 3 and 4, a plurality of the protector ribs 9 are disposed on the sidewall portion 3 at intervals in the circumferential direction of the tire. The protector ribs 9 in this embodiment are formed such that each of the protector ribs 9 extends in the radial direction of the tire at an angle $\alpha$ of 5 to 25° with respect to the radial direction, and a radially outer edge 13 located on the tread portion 2 side of the protector rib 9 has a circumferential length L1 of 10 to 25 mm. The term "angle $\alpha$" as used herein denotes an angle between a center line 13n connecting a midpoint 13p of the outer edge 13 and the radially inner end 9b, and a radially extending line 13g passing through the inner end 9b and extending in the radial direction.

The pneumatic tire 1 of the present invention has an improved cut resistance, since the rubber volume of the sidewall portions 3 is increased by the protector ribs 9. Furthermore, in the present invention, protector ribs with the outer edge 13 having a specified length L1 are disposed at intervals in the circumferential direction and, therefore, the rubber volume can be reduced as compared with a known pneumatic tire having an annular protector. Therefore, the pneumatic tire of the present invention has an improved ride comfortability, since the tire weight is reduced and an excess increase in the longitudinal rigidity of the tire is suppressed.

Figure 5:
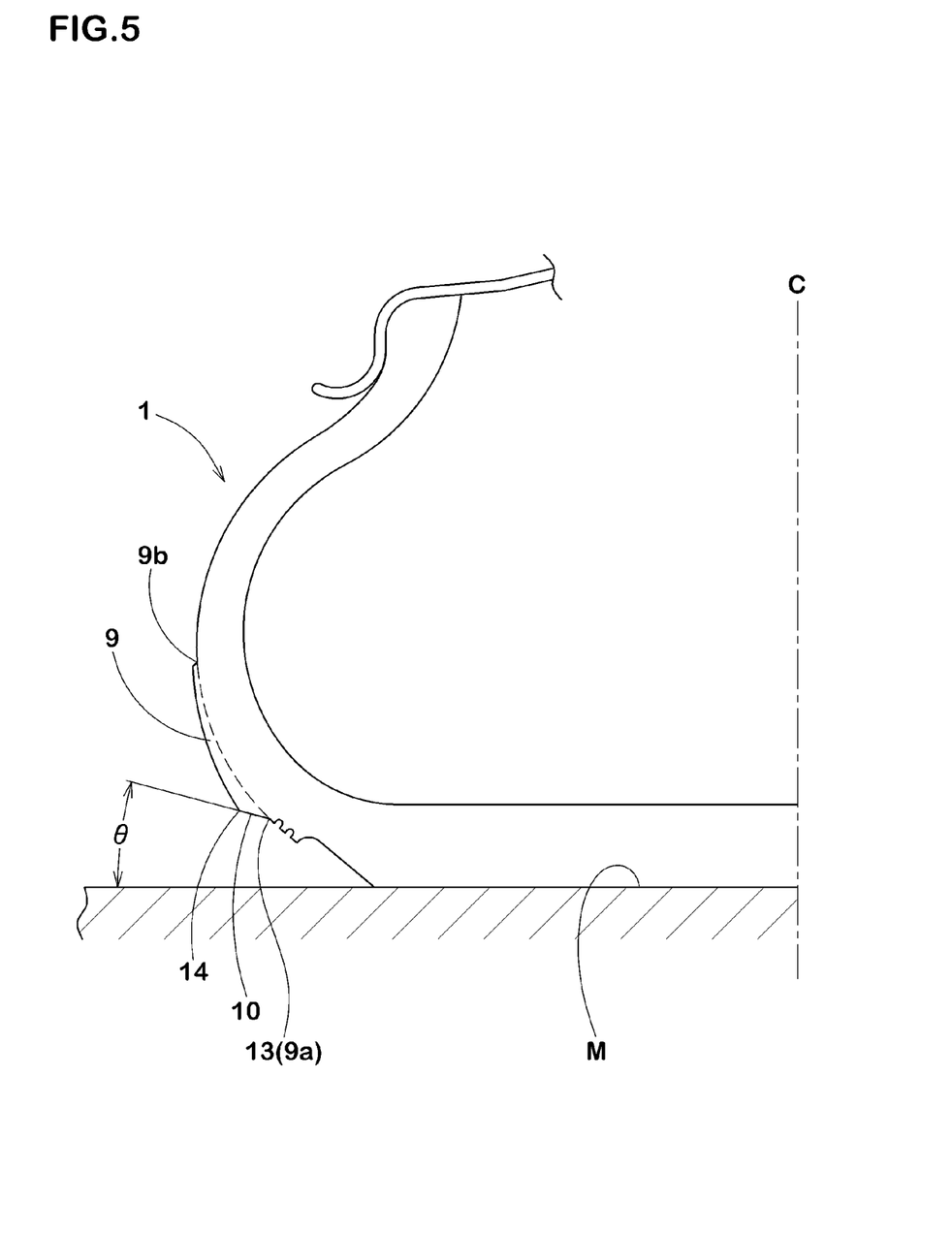
FIG. 5 is a cross sectional view of a tire illustrating a configuration of the protector rib in the normal loaded state.

The protector rib 9 has an outer wall 10 facing radially outwardly and extending from the outer edge 13 of the rib 9 to a maximum projecting portion 14 which is located radially inward of the outer edge 13 and at which a thickness t1 (shown in FIG. 2) of the protector rib 9 reaches a maximum thickness t1r. As shown in FIG. 5, in a meridian cross section of the tire 1 including a rotation axis of the tire in a normal loaded state that a normal load is applied to the tire 1 in the standard state mentioned above and the tire 1 is brought into contact with a flat surface M (e.g., ground) at a camber angle of 0°, the outer wall 10 of the protector rib 9 is parallel to the flat surface M or extends from the outer edge 13 toward the maximum projecting portion 14 at an angle $\theta$ of at most 15° with respect to the flat surface M. Such a protector rib 9 having the outer wall 10 inclined at the specified angle can ensure a high rigidity against an external force in the radial direction or the axial direction. Therefore, since the cut resistance can be enhanced while reducing the size of the protector ribs 9, the pneumatic tire 1 of the present invention can achieve a weight reduction and, moreover, the longitudinal rigidity of the tire is prevented from excessively increasing, so the pneumatic tire 1 has an improved ride comfortability. Further, since the outer wall 10 of the protector rib 9 extends outwardly in the axial direction and is inclined inwardly in the radial direction in the normal loaded state shown in FIG. 5, stones or the like hitting the outer wall 10 bounce outside the tire. Therefore, stones or the like are hard to hit the outer region 3c of the sidewall portion 3 and damage of the sidewall portion 3 is suppressed, the cut resistance of the tire is further enhanced.

The term "thickness t1" of the protector rib 9 as used herein means a distance measured from a virtual surface 3b which extends smoothly between the radially outer end 9a and the radially inner end 9b of the rib 9, to an axially outer surface 9c of the rib 9 in a direction normal to the virtual surface 3b, as shown in FIG. 2.

The term "normal load" as used herein means a load defined for every tire in the standardizing system and is, for example, "maximum load capacity" in JATMA, a maximum value recited in the table of "Tire Load Limits at Various Cold Inflation Pressures" in TRA, and "Load Capacity" in ETRTO.

If the angle α between the center line 13n of the protector rib 9 and the radial direction as defined above and as shown in FIG. 3 is more than 25°, the rigidity of the protector rib 9 against an external force in the radial direction is decreased and the protector rib 9 suffers damages such as cracking from an external force. If the angle α is less than 5°, the cut resistance is decreased since a region capable of protecting the sidewall portion 3 is decreased. From such points of view, it is preferable that the angle α is at least 7°, especially at least 10°, and it is at most 20°, especially at most 15°.

Further, if the circumferential length L1 of the outer edge 13 of the protector rib 9 is more than 25 mm, the volume of the protector rib 9 increases and, therefore, weight reduction of the tire is not sufficiently achieved. On the other hand, if the length L1 is less than 10 mm, the cut resistance is not sufficiently improved since a region capable of protecting the sidewall portion 3 is decreased. From such points of view, it is preferable that the length L1 is at least 15 mm and is at most 20 mm.

In order to further enhance the effects as mentioned above, it is preferable that the circumferential length L1 of the outer edge 13 of the protector rib 9 is at least 10%, especially at least 12%, of an arrangement pitch P in the circumferential direction for the protector ribs 9, and it is at most 15%, especially at most 14%, of the arrangement pitch P.

In the loaded state shown in FIG. 5, if the outer wall 10 of the protector rib 9 extends from the outer edge 13 toward the axial outside with being inclined in the radially outside direction, stones or the like hitting the outer wall 10 bounce toward the outer region 3c of the sidewall portion 3. Therefore, the outer region 3c is easy to be damaged, resulting in deterioration of the cut resistance of the tire. On the other hand, if the inclination angle θ of the outer wall 10 is more than 15°, the protector rib 9 becomes relatively thin, so the outer wall 10 is easy to be damaged by an external force in the axial direction and a good cut resistance is not secured. From such points of view, it is preferable that the inclination angle θ is at least 7°, and is at most 12°.

Preferably, the outer wall 10 of the protector rib 9 is formed into an approximately trapezoidal shape such that the circumferential length (width) thereof gradually decreases in a direction from the outer edge 13 toward the maximum projecting portion 14, as shown in FIG. 4. The protector rib 10 having such an outer wall 10 is particularly preferred in that it has a large rigidity. In particular, it is preferable for enhancing the rigidity of the protector rib 10 in a balanced manner that a circumferential length L2 of the maximum projecting portion 14 is at least 80%, especially at least 85%, of the circumferential length L1 of the outer edge 13, and it is at most 95%, especially at most 90%, of the circumferential length L1 of the outer edge 13.

The protector rib 9 in this embodiment is formed into a deformed pyramid shape including the outer wall 10, an inner wall 11 extending from the maximum projecting portion 14 toward a radially inner side of the tire 1, and a pair of side walls 12, 12 extending from both edges 15, 15 located at circumferentially both sides of the inner wall 11 toward an axially inner side of the tire 1. The protector rib 9 having such a configuration is preferred in enhancing the cut resistance of the tire while ensuring a large rigidity of the protector rib 9 even to an external force in the axial direction. The tip of the deformed pyramid may be truncated. Of course, the protector rib 9 may be formed into other configurations.

Preferably, as shown in FIG. 2, the thickness t1 of the protector rib 9 is gradually decreased from the maximum projecting portion 14 toward both the radially inner and outer sides of the tire. The protector rib 9 having such a configuration can reduce the rubber volume of a radially inner portion of the protector rib 9 at which the inner wall 11 is relatively hard to suffer cut damage. This is effective for further weight reduction and enhancement of ride comfortability with maintaining a good cut resistance.

The inner wall 11 in this embodiment is formed into a circular arc shape convex axially outwardly in the meridian cross section of the tire, as shown in FIG. 2. Since the virtual surface 3b of the sidewall 3 is also formed into a similar arc shape, such an inner wall 11 is effective for efficiently conducting gradual reduction of the thickness t1 of the protector rib 9. If the inner wall 11 is flat, the rigidity of the protector rib 9 becomes small relatively, so damages such as cracking may more easily occur as compared with the convexly curved wall.

As shown in FIG. 3, it is preferable that a circumferential length Lt (width) of the protector rib 9 is gradually decreased from the outside toward the inside in the radial direction of the tire. Such a protector rib 9 is effective for achieving enhancement of the rigidity of the protector rib 9 and weight reduction of the tire in a balanced manner. The inner end 9b of the protector rib 9 in this embodiment is in a tapered sharp-pointed form. That is to say, the circumferential length Lt reaches zero at the inner end 9b. The tire weight can be effectively reduced to enhance the ride comfortability by forming the inner end 9b into a sharp-pointed shape.

If the thickness t1r (shown in FIG. 2) at the maximum projecting portion 14 of the protector rib 9 is small, the cut resistance tends to lower. On the other hand, if the thickness t1r is large, the rubber volume increases to increase the tire weight and the ride comfortability tends to deteriorate. From such points of view, it is preferable that the thickness t1r at the maximum projecting portion 14 of the protector rib 9 is at least 2.0 mm, especially at least 4.0 mm, and it is at most 6.0 mm, especially at most 5.0 mm.

Figure 6:
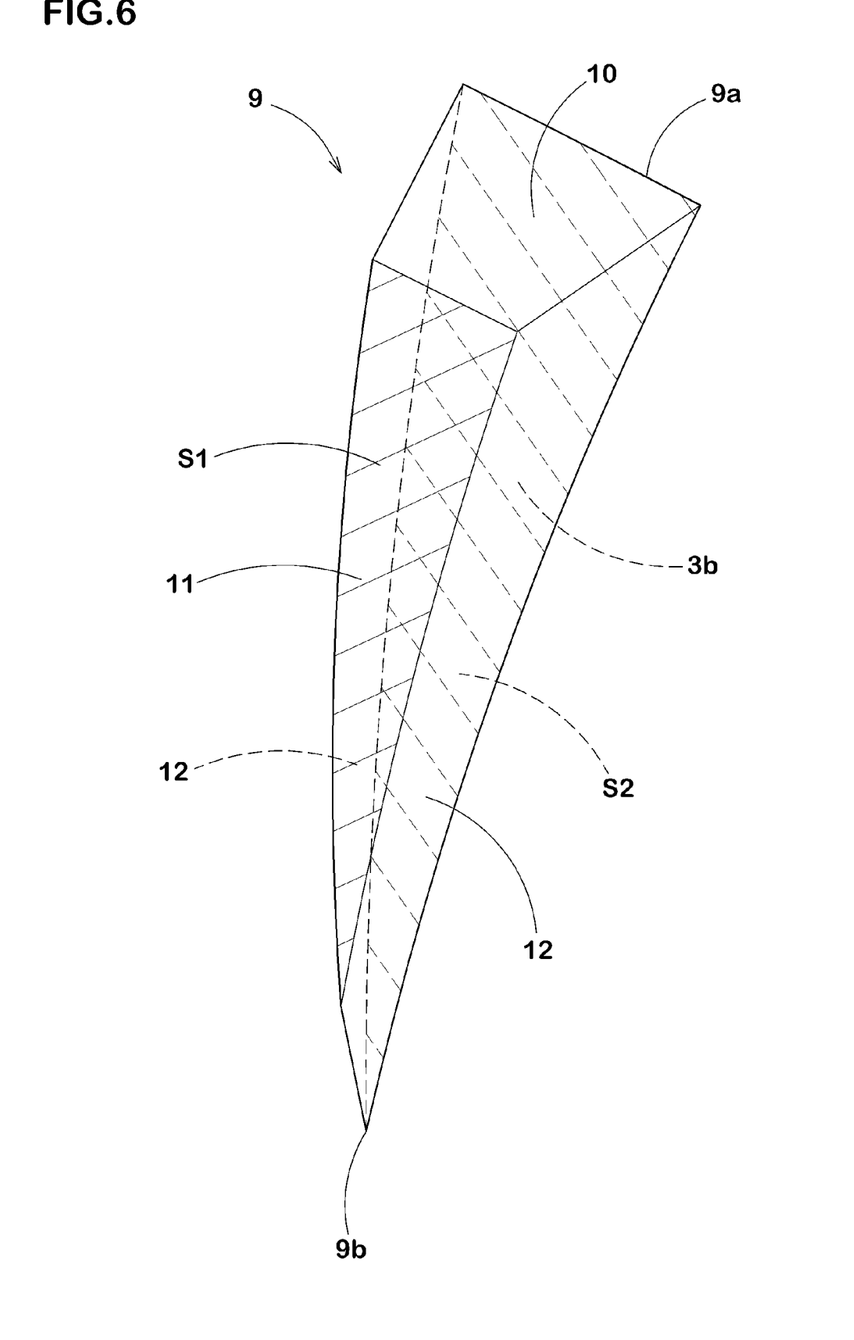
FIG. 6 is a perspective view illustrating an area of a virtual surface, i.e., a bottom surface, of the protector rib and an area of the inner wall of the protector rib.

It is preferable that an area S1 of the inner wall 11 of the protector rib 9 is at least 70%, especially at least 75%, of an area S2 of the virtual surface 3b (i.e., a bottom surface of the protector rib 9), and the area S1 is at most 100%, especially at most 90%, more especially at most 85% of the area S2. If the ratio S1/S2 is too small, the rigidity of the protector rib 9 is decreased, so a damage such as cracking tends to occur on the inner wall 11. The area S1 may be from 90 to 100% of the area S2, but from the viewpoint that the rubber volume can be decreased, the area S1 is preferably 90% or less of the area S2.

Similarly, it is preferable that a radial length L4 (shown in FIG. 2) of the outer wall 10 between the outer end 9a and the maximum projecting portion 14 is at least 15%, especially at least 17%, of a radial length L4 of the protector rib 9 between the outer end 9a and the inner end 9b, and it is at most 25%, especially at most 22%, of the length L4.

The pneumatic tire 1 may be provided with at least one small groove 16 extending continuously in the circumferential direction is formed on the sidewall portion 3 in a region R extending from the outer edge 13 of the protector rib 9 toward a radially outer side of the tire by a distance of at most 15 mm. In this embodiment as shown in FIGS. 3 and 4, two small grooves 16 are disposed separately in the radial direction. Such a small groove 16 can locally ease the longitudinal rigidity on an outer edge 13 side of the tire increased by the protector rib 9 to surely prevent deterioration of the ride comfortability. Further, since the pneumatic tire 1 whose longitudinal rigidity has been locally eased can be flexibly deformed against an external force received from a road such as rough road, it is easy to maintain the inclination angle θ of the outer wall 10 to the flat surface M within the prescribed range mentioned above. Therefore, the pneumatic tire 1 in this embodiment has a cut resistance maintained on a high level. However, if the region R for disposing the small grooves 16 is too large, there is a possibility that the longitudinal rigidity of the tire is decreased to deteriorate the ride comfortability. From such a point of view, it is preferable that the region R is at most 10 mm, especially at most 5 mm, from the outer edge 13 of the protector rib 9 in the radial direction of the tire.

In case of a pneumatic tire 1 provided with at least one small groove 16, it is preferable that an angle θo of the outer wall 10 with respect to the axial direction of the tire in the standard state is from 40 to 50°, although the angle θo is not limited to such a range. When the angle θo in the standard state is from 40 to 50°, the inclination angle θ of the outer wall 10 in the normal loaded state of the tire to the flat surface M is easy to fall within the range mentioned above in cooperation with local ease of the longitudinal rigidity by the small groove 16.

The small groove 16 in this embodiment as shown in FIGS. 2 to 4 is composed of two small grooves disposed separately in the radial direction, i.e., an inner small groove 16a and an outer small groove 16b disposed radially outward of the inner small groove 16a, whereby the longitudinal rigidity of the tire on the outer end 9a side is effectively suppressed, and the ride comfortability and the cut resistance are enhanced. Three or more small grooves 16 may be formed, but there is a possibility that the longitudinal rigidity of the tire on the outer end 9a side is excessively decreased and the steering stability is deteriorated.

Of two small grooves, the inner small groove 16a disposed radially inner side of the tire is preferably formed so that a radially inner edge 16a1 of the groove 16a is in contact with the outer edge 13 of the protector rib 9 as shown in FIGS. 2 and 3, whereby the effects as mentioned above are effectively further enhanced.

From the viewpoint of efficiently exhibiting the effects mentioned above, a groove width W of the small groove 16 is preferably at least 1.0 mm, more preferably at least 1.5 mm, and is preferably at most 4.0 mm, more preferably at most 2.5 mm. Similarly, a groove depth D of the small groove 16 is preferably at least 0.5 mm, more preferably at least 1.0 mm, and is preferably at most 4.0 mm, more preferably at most 2.0 mm.

The pneumatic tire may be optionally provided with slightly raised portions 17 on both axially outer sides of the protector rib 9 slightly apart from the protector rib 9, as shown in FIGS. 3 and 4. The height of the slightly raised portion 17 is smaller than that of the protector rib 9. Such a raised portion 17 serves to further enhance the cut resistance with suppressing an increase in tire weight.

It is preferable that a sidewall rubber 3G which constitutes the outer surface of the sidewall portion 3 including the protector ribs 9 according to this embodiment, has a complex elastic modulus E* of at least 3.5 MPa, especially at least 3.8 MPa. If the complex elastic modulus E* is too small, there is a possibility that the rigidity of the protector rib 9 is lowered to deteriorate the cut resistance. On the other hand, if the complex elastic modulus E* is too large, there is a possibility that the longitudinal rigidity of the sidewall portion 3 is excessively increased to deteriorate the ride comfortability. Therefore, it is preferable that the complex elastic modulus E* of the sidewall rubber 3G is at most 4.5 MPa, especially at most 4.2 MPa.

Further, from the viewpoint of exhibiting the effects mentioned above, it is preferable that the sidewall rubber 3G has a fracture energy of at least 3,500, especially at least 4,000.

The term "complex elastic modulus" as used herein means a value measured with a viscoelasticity spectrometer under the conditions of measuring temperature 30° C., frequency 10 Hz, initial elongation strain 10% and dynamic strain ±2%. The term "fracture energy" as used herein means a value expressed by (tensile strength at break)×(tensile elongation at break)×½ in which the tensile strength at break (N) and the tensile elongation at break (%) are measured at 23° C. according to JIS K 6251 "Rubber, vulcanized or thermoplastic—Determination of tensile stress-strain properties" using dumbbell No. 3 specimens made of a thermoplastic sheet or a vulcanized rubber sheet.

The number of the protector ribs 9 to be disposed is not particularly limited and is suitably determined in consideration of tire size, effects as mentioned above, and so on. Preferably, the protector ribs are disposed at the same pitch P as the pitch of a pattern formed in the tread portion 2.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Pneumatic tires (size: LT325/65R18) having the structure shown is in FIGS. 1 and 3 were manufactured based on the specifications shown in Table 1. Other specifications of the tires than the protector rib are substantially common to all tires. Main such specifications are shown below.
Tread width TW: 262 mm
Number of carcass plies: three
Carcass cord angle: 88°
Material of carcass cord: polyester
Number of belt plies: two
Belt cord angle: 19°
Material of belt cord: steel
Rim: 18×9J
Inner pressure of tire: 275 kPa The cut resistance, ride comfortability, steering stability, cracking resistance and weight of the tires were evaluated according to the following methods.
(1) Cut Resistance Tires were attached to all wheels of a four-wheel drive car (Chevrolet Silverado 2500HD), and the car was run 50 km on a rough road strewn with rocks and stones. Thereafter, cuts on the outer surface of the sidewall portion were visually observed, and the cut resistance was evaluated according to the following criteria.
O: No occurrence of cuts, or occurrence of cuts having a depth of not more than 0.5 mm
Δ: Occurrence of cuts having a depth of more than 0.5 mm to not more than 2.0 mm
x: Occurrence of cuts having a depth of more than 2.0 mm
(2) Ride Comfortability When running on the rough road in the above-mentioned test, ride comfortability was evaluated by test driver's feeling. It was evaluated by a 10 points rating scale. The larger the value, the better the performance.
(3) Cracking Resistance Tires were allowed to stand in an atmosphere having an ozone concentration of 50 pphm. Thereafter, the inner pressure of the tires was adjusted, and each of them was run on a drum for 200 hours under conditions of load 20.24 kN and speed 80 km/h. State of generation of cracks and chipping of rubber in the protector ribs was visually observed and evaluated according to the following criteria.

◯: No occurrence of crack, or occurrence of cracks having a depth of not more than 0.5 mm
Δ: Occurrence of cracks having a depth of more than 0.5 mm to not more than 2.0 mm
x: Occurrence of cracks having a depth of more than 2.0 mm (4) Weight of Tire The weight of tire was measured and expressed as an index based on the result of Comparative Example 1 regarded as 100. The smaller the value, the lighter and the better the tire.

It is observed in Table 1 that the pneumatic tires of the Examples according to the present invention produce a good result for strain performance while suppressing deterioration of wet performance, as compared with the Comparative Examples.

The results are shown in Table 1

It is observed in Table 1 that the pneumatic tires of the Examples according to the present invention have a good cut resistance and a good ride comfortability which have been improved with balance, as compared with those of the Comparative Examples.

TABLE 1

|  | Com. Ex. 1 | Com. Ex. 2 | Com. Ex. 3 | Ex. 1 | Ex. 2 | Ex. 3 |
| --- | --- | --- | --- | --- | --- | --- |
| Configuration of protector rib | FIG. 7 | FIG. 3 | FIG. 3 | FIG. 3 | FIG. 3 | FIG. 3 |
| Angle θ between outer wall and flat surface (degree)* | +7.5 | −5 | +20 | +7.5 | 0 | +15 |
| Angle α of protector rib to radial direction (degree) | — | 8 | 8 | 8 | 8 | 8 |
| Ratio L2/L1 of circumferential length L2 of maximum projecting portion to circumferential length L1 of outer edge (%) | 100 | 90 | 90 | 90 | 90 | 90 |
| Ratio S1/S2 of area S1 of inner wall to area S2 of virtual surface (%) | 100 | 80 | 80 | 80 | 80 | 80 |
| Presence of small groove | no | yes | yes | yes | yes | yes |
| Radial distance between outer edge of protector rib and outermost edge of small groove (mm) | — | 5.0 | 5.0 | 5.0 | 5.0 | 5.0 |
| Cut resistance | ◯ | x | x | ◯ | Δ | ◯ |
| Ride comfortability (10 point scale) | 6 | 8 | 8 | 8 | 8 | 8 |
| Cracking resistance | ◯ | ◯ | ◯ | ◯ | ◯ | ◯ |
| Weight of tire (index) | 100 | 98 | 98 | 98 | 98 | 98 |

|  | Com. Ex. 4 | Com. Ex. 5 | Ex. 4 | Ex. 5 | Ex. 6 | Ex. 7 | Ex. 8 |
| --- | --- | --- | --- | --- | --- | --- | --- |
| Configuration of protector rib | FIG. 3 | FIG. 3 | FIG. 3 | FIG. 3 | FIG. 3 | FIG. 3 | FIG. 3 |
| Angle θ between outer wall and flat surface (degree)* | +7.5 | +7.5 | +7.5 | +7.5 | +7.5 | +7.5 | +7.5 |
| Angle α of protector rib to radial direction (degree) | −2 | 30 | 5 | 25 | 8 | 8 | 8 |
| Ratio L2/L1 of circumferential length L2 of maximum projecting portion to circumferential length L1 of outer edge (%) | 90 | 90 | 90 | 90 | 75 | 100 | 80 |
| Ratio S1/S2 of area S1 of inner wall to area S2 of virtual surface (%) | 80 | 80 | 80 | 80 | 80 | 80 | 80 |
| Presence of small groove | yes | yes | yes | yes | yes | yes | yes |
| Radial distance between outer edge of protector rib and outermost edge of small groove (mm) | 5.0 | 5.0 | 5.0 | 5.0 | 5.0 | 5.0 | 5.0 |
| Cut resistance | x | Δ | ◯ | ◯ | Δ | ◯ | ◯ |
| Ride comfortability (10 point scale) | 8 | 8 | 8 | 8 | 8 | 7 | 8 |
| Cracking resistance | ◯ | x | ◯ | Δ | ◯ | Δ | ◯ |
| Weight of tire (index) | 98 | 98 | 98 | 98 | 98 | 98 | 98 |

|  | Ex. 9 | Ex. 10 | Ex. 11 | Ex. 12 | Ex. 13 | Ex. 14 | Ex. 15 |
| --- | --- | --- | --- | --- | --- | --- | --- |
| Configuration of protector rib | FIG. 3 | FIG. 3 | FIG. 3 | FIG. 3 | FIG. 3 | FIG. 3 | FIG. 3 |
| Angle θ between outer wall and flat surface (degree)* | +7.5 | +7.5 | +7.5 | +7.5 | +7.5 | +7.5 | +7.5 |
| Angle α of protector rib to radial direction (degree) | 8 | 8 | 8 | 8 | 8 | 8 | 8 |
| Ratio L2/L1 of circumferential length L2 of maximum projecting portion to circumferential length L1 of outer edge (%) | 95 | 90 | 90 | 90 | 90 | 90 | 90 |
| Ratio S1/S2 of area S1 of inner wall to area S2 of virtual surface (%) | 80 | 65 | 95 | 70 | 90 | 80 | 80 |
| Presence of small groove | yes | yes | yes | yes | yes | no | yes |
| Radial distance between outer edge of protector rib and outermost edge of small groove (mm) | 5.0 | 5.0 | 5.0 | 5.0 | 5.0 | — | 5.0 |
| Cut resistance | ◯ | Δ | ◯ | ◯ | ◯ | ◯ | ◯ |

TABLE 1-continued

| Ride comfortability (10 point scale) | 8 | 8 | 7 | 8 | 8 | 7 | 7 |
|---|---|---|---|---|---|---|---|
| Cracking resistance | ○ | ○ | Δ | ○ | ○ | ○ | ○ |
| Weight of tire (index) | 98 | 98 | 98 | 98 | 98 | 98 | 98 |

*Angle θ is expressed by "+" when the outer wall extends from the outer edge toward the maximum projecting portion with inclination in a direction away from a flat surface on which the tire is placed.

What is claimed is:

1. A pneumatic tire comprising:
a tread portion;
a pair of sidewall portions extending radially inwardly from both axial ends of the tread portion;
a pair of bead portions disposed at radially inner ends of the sidewall portions; and
a plurality of protector ribs disposed on an outer surface of at least one of said sidewall portions at intervals in a circumferential direction of the tire, wherein
each of said protector ribs projects axially outwardly from said outer surface,
each of said protector ribs extends at an angle of 5 to 25 degrees with respect to a radial direction of the tire,
each of said protector ribs includes a radially outer wall facing radially outward,
said radially outer wall extends from a radially outer edge of the rib to a maximum projecting portion of the rib at which the rib reaches its maximum thickness,
said radially outer edge of the rib has a circumferential length of 10 to 25 mm,
in a meridian section of the tire in its normal loaded state in which the tire mounted on a standard rim, inflated to a normal tire pressure and loaded with a normal tire load is set on a flat horizontal surface at a camber angle of zero degrees, said radially outer wall is parallel with said flat horizontal surface or extends from said radially outer edge to said maximum projecting portion with inclination in a direction away from said flat horizontal surface at an angle of at most 15 degrees with respect to said flat horizontal surface, wherein
said radially outer wall has an approximately trapezoidal shape such that a circumferential width thereof gradually decreases from said radially outer edge toward said maximum projecting portion.

2. A pneumatic tire comprising:
a tread portion;
a pair of sidewall portions extending radially inwardly from both axial ends of the tread portion;
a pair of bead portions disposed at radially inner ends of the sidewall portions; and
a plurality of protector ribs disposed on an outer surface of at least one of said sidewall portions at intervals in a circumferential direction of the tire, wherein
each of said protector ribs projects axially outwardly from said outer surface,
each of said protector ribs extends at an angle of 5 to 25 degrees with respect to a radial direction of the tire,
each of said protector ribs includes a radially outer wall facing radially outward,
said radially outer wall extends from a radially outer edge of the rib to a maximum projecting portion of the rib at which the rib reaches its maximum thickness,
said radially outer edge of the rib has a circumferential length of 10 to 25 mm,
in a meridian section of the tire in its normal loaded state in which the tire mounted on a standard rim, inflated to a normal tire pressure and loaded with a normal tire load is set on a flat horizontal surface at a camber angle of zero degrees, said radially outer wall is parallel with said flat horizontal surface or extends from said radially outer edge to said maximum projecting portion with inclination in a direction away from said flat horizontal surface at an angle of at most 15 degrees with respect to said flat horizontal surface, wherein
a circumferential length of said maximum projecting portion is from 80% to 95% of the circumferential length of said radially outer edge.

3. The pneumatic tire of claim 1, wherein said protector rib has such a thickness as gradually decreasing from said maximum projecting portion toward a radially inner side of the tire.

4. The pneumatic tire of claim 1, wherein said protector rib has a deformed pyramid shape including said radially outer wall, an inner wall extending from said maximum projecting portion toward a radially inner side of the tire, and a pair of side walls extending from said inner wall toward an axially inner side of the tire.

5. The pneumatic tire of claim 4, wherein said inner wall of the protector rib has an area of 70 to 100% of an area of a virtual surface extending between said radially outer edge of the protector rib and a radially inner end of the protector rib along a surface of said sidewall portion.

6. A pneumatic tire comprising:
a tread portion;
a pair of sidewall portions extending radially inwardly from both axial ends of the tread portion;
a pair of bead portions disposed at radially inner ends of the sidewall portions; and
a plurality of protector ribs disposed on an outer surface of at least one of said sidewall portions at intervals in a circumferential direction of the tire, wherein
each of said protector ribs projects axially outwardly from said outer surface,
each of said protector ribs extends at an angle of 5 to 25 degrees with respect to a radial direction of the tire,
each of said protector ribs includes a radially outer wall facing radially outward,
said radially outer wall extends from a radially outer edge of the rib to a maximum projecting portion of the rib at which the rib reaches its maximum thickness,
said radially outer edge of the rib has a circumferential length of 10 to 25 mm,
in a meridian section of the tire in its normal loaded state in which the tire mounted on a standard rim, inflated to a normal tire pressure and loaded with a normal tire load is set on a flat horizontal surface at a camber angle of 0 degree, said radially outer wall is parallel with said flat horizontal surface or extends from said radially outer edge to said maximum projecting portion with inclination in a direction away from said flat horizontal surface at an angle of at most 15 degrees with respect to said flat horizontal surface, wherein
a circumferential length of said protector rib is gradually decreased from a radially outer side toward a radially inner side.

7. A pneumatic tire comprising:

a tread portion;

a pair of sidewall portions extending radially inwardly from both axial ends of the tread portion;

a pair of bead portions disposed at radially inner ends of the sidewall portions; and a plurality of protector ribs disposed on an outer surface of at least one of said sidewall portions at intervals in a circumferential direction of the tire, wherein each of said protector ribs projects axially outwardly from said outer surface, each of said protector ribs extends at an angle of 5 to 25 degrees with respect to a radial direction of the tire, each of said protector ribs includes a radially outer wall facing radially outward, said radially outer wall extends from a radially outer edge of the rib to a maximum projecting portion of the rib at which the rib reaches its maximum thickness, said radially outer edge of the rib has a circumferential length of 10 to 25 mm, in a meridian section of the tire in its normal loaded state in which the tire mounted on a standard rim, inflated to a normal tire pressure and loaded with a normal tire load is set on a flat horizontal surface at a camber angle of 0 degree, said radially outer wall is parallel with said flat horizontal surface or extends from said radially outer edge to said maximum projecting portion with inclination in a direction away from said flat horizontal surface at an angle of at most 15 degrees with respect to said flat horizontal surface, wherein at least one small groove extending in the circumferential direction is formed on said sidewall portion in a region extending radially outwardly from said radially outer edge of the protector rib by a distance of at most 15 mm.

8. The pneumatic tire of claim 7, wherein said at least one small groove comprises two small grooves disposed separately in the radial direction of the tire.

9. The pneumatic tire of claim 8, wherein the radially inner small groove is disposed immediately radially outside said radially outer edge of the protector rib.

* * * * *